June 19, 1951          H. W. RECK          2,557,763
WHEEL SUSPENSION
Filed Aug. 5, 1948
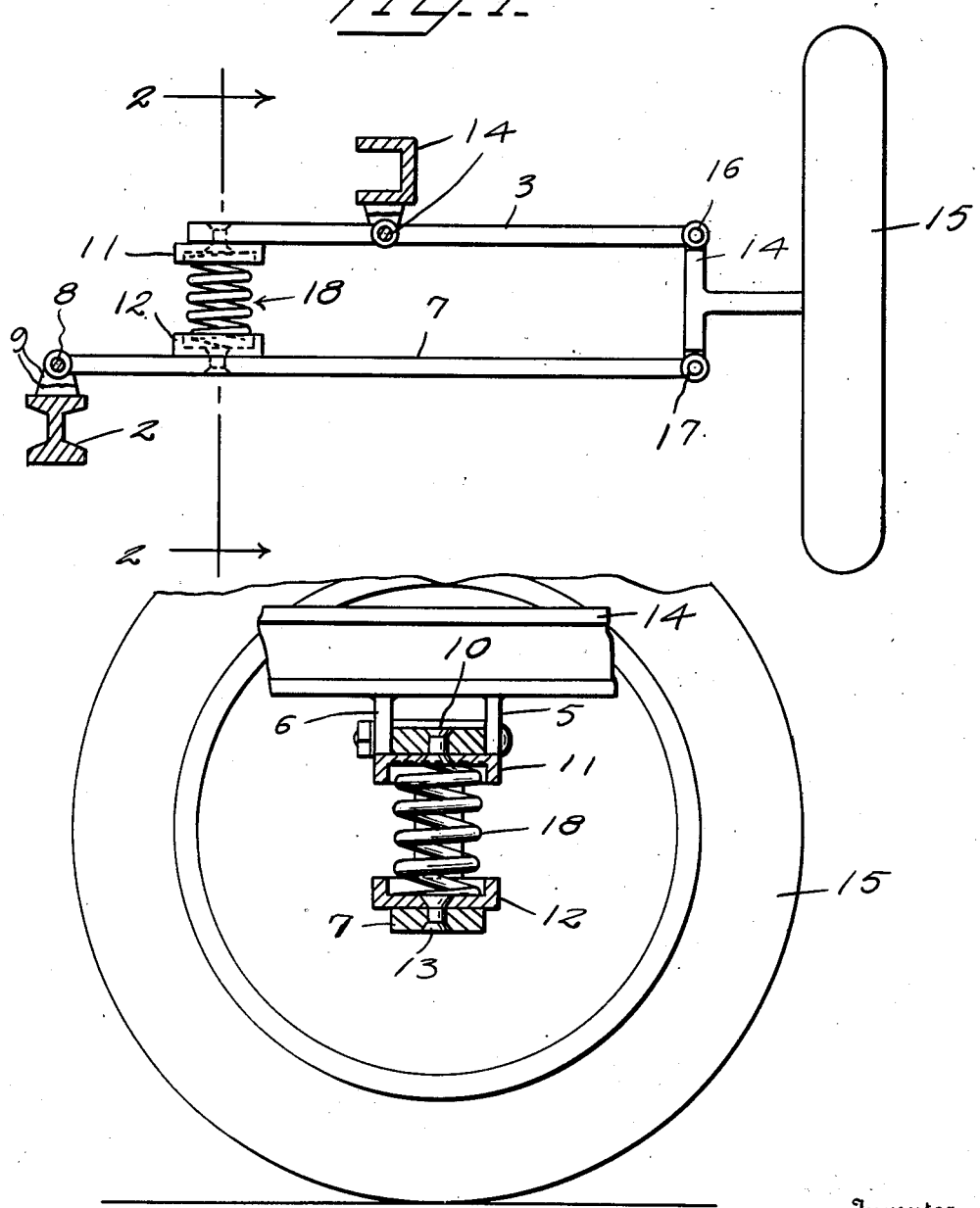
Inventor
H. W. Reck
By Kimmel & Crowell
Attys.

Patented June 19, 1951

2,557,763

UNITED STATES PATENT OFFICE 2,557,763

WHEEL SUSPENSION

Hilbert W. Reck, Elgin, Ill.

Application August 5, 1948, Serial No. 42,620

1 Claim. (Cl. 267—20)

This invention relates to the suspension of vehicle wheels.

An object of this invention is to provide a vehicle wheel suspension which will more adequately absorb road shocks.

A further object of this invention is to provide a vehicle wheel suspension embodying two vertically spaced apart pivoted levers, a wheel carrying member pivotally connected to the adjacent ends of the two levers and a spring mounted between the levers for compression and expansion by said levers.

With the above and other objects in view, my invention consists of the arrangement, combination and details of construction disclosed in the drawings and specification and then more particularly defined in the appended claim.

In the drawings

Figure 1 is a front elevation of the vehicle wheel suspension;

Figure 2 is an enlarged sectional view of the spring mounting along line 2—2 of Figure 1.

Referring to the drawing, Figure 1, numeral 1 refers to a frame member of a vehicle chassis. Numeral 2 refers to another frame member of a vehicle chassis. Frame members 1 and 2 are rigid relative to one another.

Reference numeral 3 indicates a top or upper lever pivotally supported intermediate its length by the pin 4 extending through lugs 5 and 6 which are carried by the frame member 1. The lugs 5 and 6 may be attached to the frame member by welding or by any other well known means.

Reference numeral 7 indicates a lower lever which is disposed below the top or upper lever and extends substantially parallel to the upper lever. The lower lever 7 is of greater length than the upper lever and is arranged with one end substantially in vertical alignment with an adjacent end of the upper lever. The lower lever 7 is pivotally supported by the pin 8 which is carried by the lugs 9 which are attached by welding or any other well known means to the frame member 2.

The inner end of lever 3 has rigidly secured thereto by the rivet 10 an upper spring retaining cup 11. The lower lever 7 has secured to the top thereof a second spring retaining cup 12 secured to the lever by rivet 13. The upper and lower spring retaining cups are disposed substantially in vertical alignment. A wheel carrying member 14 supporting the wheel 15 is pivotally connected at its ends to the other end of the top or upper lever 3 and to the free end of the lower lever 7 by the pins 16 and 17 respectively. Arranged between the upper and lower spring retaining cups is a coil spring 18.

Operation

From Figure 1 it can be seen that vertical movement of the wheel 15 and the wheel carrying member 14 will cause rocking of the top or upper lever 3 and of the lower lever 7. When the wheel is moved upwards the upper spring retaining cup 11 which is mounted on the end of the upper lever 3 opposite from the connecting pin 16 with the pivoting pin 4 in between will move downwards. The lower spring retaining cup 12 which is mounted on the lower lever 7 on the same side of the pivot point 8 as the pin connecting the wheel carrying member to the lever will move upwards. The downward movement of the upper spring retaining cup and the upward movement of the lower spring retaining cup will result in compression of the spring 18. Upon downward movement of the wheel 15 by the same reasoning the upper retaining cup will move upwards and the lower retaining cup will move downwards resulting in an expansion of the spring 18.

Therefore, the spring 18 will be effective to resiliently resist the vertical displacement of the wheel 15. The arrangement set forth is especially effective to absorb road shocks as encountered in the suspension of vehicle wheels.

The foregoing represents the details of a preferred embodiment of my invention. However, I do not mean to be limited by these details but claim all devices falling within the appended claim.

What I claim is:

Wheel suspension means for a vehicle having a chassis including fixed upper and lower frame members, the lower member being disposed inwardly of the vehicle relative to the upper, comprising a wheel carrying member including a vertical upright, a lower lever pivotally secured at one end to said upright and pivotally secured at its other end to said lower frame member, an upper lever pivotally connected at one end to the upper end of said upright and pivotally secured at an intermediate point thereof to said upper frame member, the free end of said upper lever terminating a substantial distance short of said other end of said lower lever, a disc shaped spring retaining cup secured to the underside of said free end of said upper lever, a disc shaped cup secured to the upper side of said lower lever at an intermediate point thereof directly vertically aligned with said first mentioned cup, and a compression spring having its opposite ends secured in said cups and extending therebetween.

HILBERT W. RECK.

REFERENCES CITED

The following references are of record in the file of this patent:

UNITED STATES PATENTS

| Number | Name | Date |
|---|---|---|
| 2,007,952 | Armstrong | July 16, 1935 |
| 2,297,591 | Urich | Sept. 29, 1942 |

FOREIGN PATENTS

| Number | Country | Date |
|---|---|---|
| 475,625 | Great Britain | Nov. 23, 1937 |
| 843,699 | Great Britain | Apr. 3, 1939 |